United States Patent [19]

Cassell

[11] 4,155,970

[45] May 22, 1979

[54] METHOD FOR MAKING A HOLLOW COMPOSITE USING A DESTRUCTIBLE CORE

[75] Inventor: George J. Cassell, Huntington Beach, Calif.

[73] Assignee: McDonnell Douglas Corporation, Long Beach, Calif.

[21] Appl. No.: 848,663

[22] Filed: Nov. 4, 1977

[51] Int. Cl.² .................. B29C 1/08; B29C 27/00; B29G 5/00

[52] U.S. Cl. .................................. 264/137; 264/139; 264/155; 264/221; 264/230; 264/257; 264/317; 264/334; 264/342 R

[58] Field of Search ............... 264/137, 139, 154, 250, 264/255, 313, 315, 316, 317, 338, 155, 221, 230, 342 R, 334, 257

[56] References Cited

U.S. PATENT DOCUMENTS

| | | | |
|---|---|---|---|
| 1,504,547 | 8/1924 | Egerton | 264/317 |
| 2,345,977 | 4/1944 | Howald et al. | 264/219 |
| 2,755,216 | 7/1956 | Lemons | 156/155 |
| 3,126,680 | 3/1964 | Baird et al. | 264/230 |
| 3,225,129 | 12/1965 | Taylor et al. | 264/230 |
| 3,795,559 | 3/1974 | Horn et al. | 156/173 |

Primary Examiner—W. E. Hoag
Attorney, Agent, or Firm—John P. Scholl; Walter J. Jason; Donald L. Royer

[57] ABSTRACT

A method of making a high temperature fluted core composite radome structure.

6 Claims, 6 Drawing Figures

METHOD FOR MAKING A HOLLOW COMPOSITE USING A DESTRUCTIBLE CORE

BACKGROUND OF THE PRESENT INVENTION

This invention relates to a method of manufacture of hollow core composite enclosures for radio frequency (RF) transmitting and receiving antennas such as radar. These enclosures are commonly designated radomes.

Radomes are exposed to a variety of temperatures as well as diverse climatic conditions. The radomes may be subjected to rain, hail, ice and snow as well as extreme heat due to the temperature at a particular location, heat created by the high speed of the aircraft, and heat created by operation of the enclosed electrical equipment. In addition, the radome may be subject to large changes in atmospheric pressure as the aircraft ascends and descends in altitude.

PRIOR ART

Radomes have been made of plywood, plastics, ceramics, glass and reinforced plastics. To provide a lightweight radome with good transmission characteristics, sandwich structures are commonly used. The core of the sandwich structure is usually of honeycomb, foam, or fluted core. The facings of the sandwich are normally composed of a binder of polyester, epoxy or polyimide resin reinforced with a glass or fused silica cloth. New methods for fabricating radomes that will operate at temperatures of 500° F. to 700° F. and possibly up to 1000° F. are required. These temperature requirements are created by aerodynamic heating of radomes due to high speed of aircraft and by RF power absorption heating by high power electronic countermeasures antennas. Radomes constructed with honeycombs and adhesive films are presently limited for long term exposure to temperatures less than 500° F. Honeycomb core radomes, even for low temperature applications, have had a history of moisture entering the cells through pin holes or damaged areas in the facings. The moisture can then migrate through large sections, causing structural and antenna pattern degradation. Physical damage to the radome occurs if the water freezes in the cells and expands.

The problems with the honeycomb core become more acute with high temperature radomes because the high temperature resins are more porous and more difficult to seal. In this later case the moisture penetrating the core can be converted to ice at low temperatures or steam if the radome temperature exceeds the boiling point of water.

The type of process having the greatest potential for high temperature sandwich radomes is the fluted core process. This process provides the channels necessary for moisture drainage, air expansion and convection cooling of the radome wall. This process also allows the same resin used in the facings to be used in the core and allows the parts to be fabricated in a single stage. The use of wax mandrels as found in U.S. Pat. No. 2,755,216, "Process for Forming a Multi-Ducted Shell" is unsuitable for high temperature radomes because candidate waxes melt at about 125° F. whereas the high temperature resins harden at 325° F. to 350° F. Removable steel, Teflon, and silicon rubber mandrels as found in U.S. Pat. No. 3,795,559, "Aircraft Fluted Core Radome and Method for Making the Same" require that the ends of the flutes be fully open so the mandrels can be removed. If the ends of the flutes are to remain open, difficulty is encountered in transferring loads from the inner facings to the attach flange. Further, it is very difficult to install transition doublers over the ends of the open channels once the mandrels have been removed because adequate pressure cannot be obtained in curing the secondary laminate against the open ended air filled flutes. Even with adequate pressure, a good secondary bond of high temperature resins is difficult to obtain.

In U.S. Pat. No. 2,519,036, a method is described whereby sand is used in a flexible sheath to form a mandrel. The tolerances obtained with this process are inadequate for fabricating precision structural parts such as radome. Further, the sheath which remains in the structure is unacceptable from an antenna performance standpoint.

BRIEF DESCRIPTION OF THE INVENTIVE METHOD

In order to form the hollow core of the radome structure, a higher melting temperature mandrel material was needed. Such material would have to be malleable in order to form the variety of shapes but still have sufficient strength to hold its cross-sectional configuration during the curing cycle. Lead was found to be a good material for holding its cross-sectional configuration and sufficiently malleable to form the radome contours. Further, the lead melting temperature was within the proper range for the proposed resin curing. However, when lead was used as a mandrel to construct the hollow core, small particles of lead were left in the radome following its melting and removal. These lead particles had a deleterious effect on the electronic transmission and reception.

The inventive manufacturing method uses a flexible tube to surround the lead mandrel. These tubes may be of heat shrinkable inert material such as Teflon TFE (Tetra fluoroethylene). The tubes are placed over the lead mandrels and shrunk to tightly surround the mandrel. The Teflon shielded lead mandrel is then wound with fiber glass or fused silica which may be resin-impregnated The Teflon shielded lead mandrel may, in the alternative, be surrounded by a braided fiber glass or fused silica sleeve. The mandrel is then made up as a part of a composite radome structure and the resin is then cured. When the curing cycle is completed, holes are drilled in the radome structure to expose the ends of the lead mandrels. The lead is then melted out of the tubes. The Teflon tubes are then heated and shrunken to facilitate their removal from the radome structure through the holes. In the final configuration of the radome structure, the interior hollow core provides strength to the structure and hot or cold gas may be circulated through the hollow core to keep the radome at optimum operating temperature. Although the holes are drilled in the flutes at the edge of the core next to the attach flange, there is still sufficient strength in this area to efficiently transfer the loads from the inside facings and core into the attach flange.

The advantages of the lead mandrel/Teflon sleeve process are:

a. Radomes can be fabricated in a single stage;

b. The process eliminates need for high temperature resin adhesive film to bond facing support sheets to the core;

c. The core and facings are an integral unit that has the same temperature characteristics as a solid laminate made of the same resin and reinforcement fiber;

d. Sealing of the outside surface is not critical because moisture can be drained through the drain holes at the ends of the flutes;

e. Air or steam can expand in the open flutes without delaminating the surface facings;

f. Air can circulate freely in the hollow core to provide convection cooling;

g. The ends of the flutes are closed (except for drain holes) and provide a means of transferring loads from the inside facings into the attach flange;

h. The mandrel, Teflon sleeve and mandrel contaminates are completely removed from the structure and this results in better electrical characteristics in the finished radome; and i. Close tolerances are held on critical dimensions of the radome.

DESCRIPTION OF PREFERRED EMBODIMENT

Figure 1:
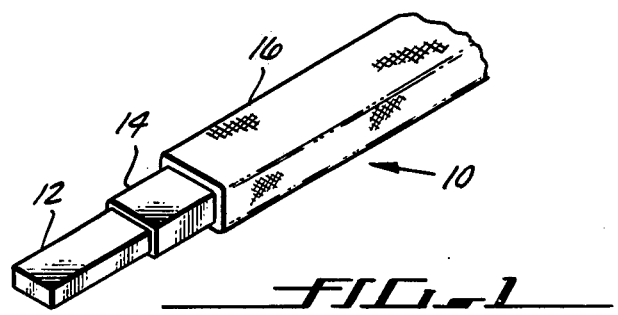
FIG. 1 is a cutaway view of a lead mandrel surrounded by a Teflon shrink tube and covered with braided glass or fused silica sleeve.

In FIG. 1 the basic construction unit 10 for manufacturing the composite radome is shown. The unit 10 is composed of a lead mandrel 12 with rectangular cross section, a Teflon shrink tube 14 surrounding the lead mandrel and a braided fused silica sheath or sleeve 16.

To assemble the unit 10, a lead mandrel 12 is inserted into a Teflon tube 14. The tube 14 is then heated and tightly shrunk around the mandrel 12. The Teflon shielded lead mandrel 12 may then be covered with the reinforcement fabric (as, for example, fused silica or quartz) by placing the shielded lead mandrel in a braiding machine where it is covered by a braided quartz sleeve 16. This braided reinforcement fabric may be impregnated with binder material of polyimide resin, for example.

Figure 2:
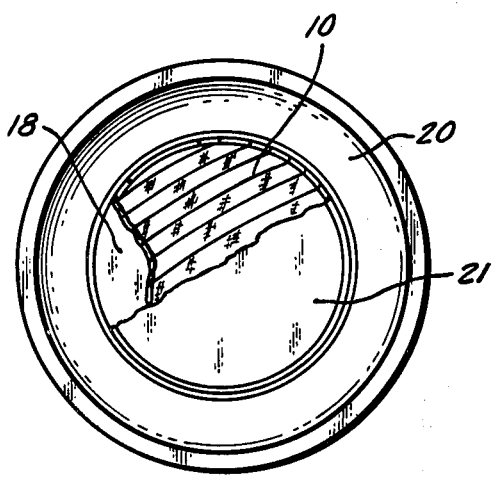
FIG. 2 depicts the mandrel of FIG. 1 placed in a mold to form a radome.

To construct a radome with hollow fluted core, a first layer of binder impregnated cloth 18 (as, for example, quartz cloth impregnated with polyimide resin) is laid inside of the mold 20. A number of the basic building units 10 of FIG. 1 are then assembled in a parallel configuration in the mold 20. Finally, a second layer of resin impregnated cloth 21 may be laid over the units as shown in FIG. 2. The entire radome is then cured until the binder has hardened.

Figure 3:
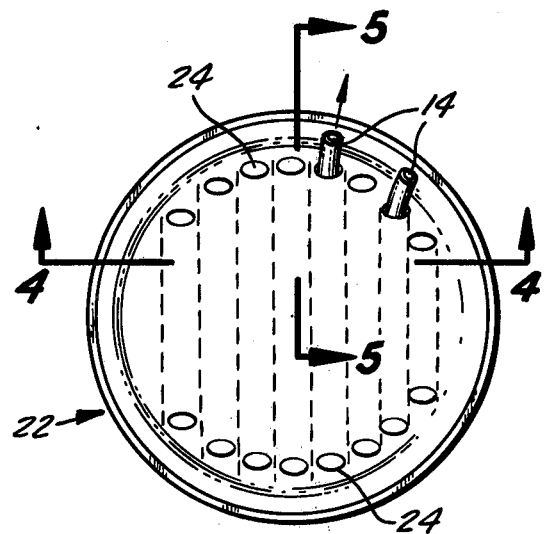
FIG. 3 depicts the radome of FIG. 2 after curing. The ends of the Teflon shrink tubes have been exposed. The tubes have been heated and shrunk to a smaller cross section to facilitate the removal for the radome.
Figure 5:
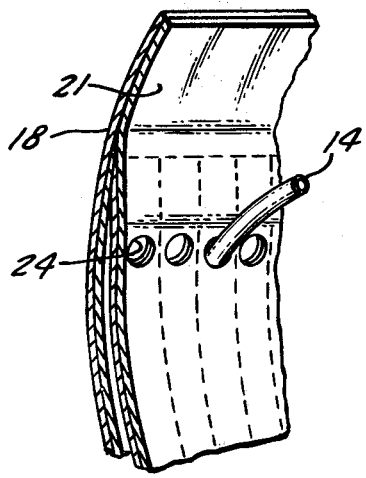
FIG. 5 is a cross section along the lines 5—5 of FIG. 3 and is a view of the lead drain hole area showing a shrink tube being removed through a drain hole.

The ends of lead mandrels 12 are then exposed by drilling or cutting holes 24 through the braided composite and Teflon sleeves, FIGS. 3 and 5. The radome 22 is then heated and the lead is melted and removed from the Teflon shrink tube 14.

When the lead mandrel 12 has been removed, the Teflon shrink tube 14 is heated further to reduce its cross-sectional size. By reducing the size of shrink tube 14, its removal through the holes 24 from the interior of the radome 22 is facilitated. When the shrink tube 14 is removed from the radome, the minute particles of lead which did not melt out are removed from the interior of the radome 22. These lead particles would be deleterious to the operation of the antenna if they remained within the radome 22.

Figure 4:
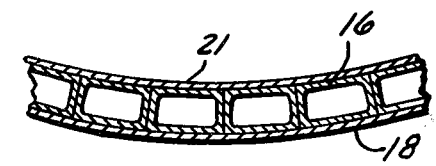
FIG. 4 is a cross section through the radome of FIG. 3 along the lines 4—4 showing the hollow core configuration.

In FIG. 4 the surface layers 18, 21 of the hollow fluted radome 22 are shown. The rectangular cross section of the braided sleeve 16 adds strength to the hollow core radome 22.

Figure 6:
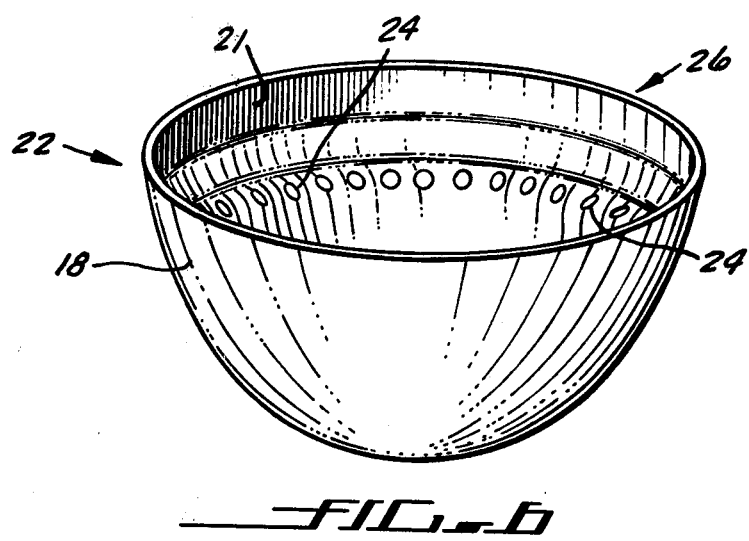
FIG. 6 is an oblique view of the radome showing the drain holes 24 in completed radome.

In FIG. 5 the joinder of the interior and exterior coverings or facings 18 and 21 is depicted. By cutting (drilling) holes 24 through the interior facing 21 to expose the lead mandrels 12, good transfer of the loads from the interior to the exterior layer and the support flange 26 is still achieved (FIG. 6).

The manufacture of hollow fluted core radomes 22 is achieved by the following steps: Forming a lead mandrel with rectangular cross section 12 and covering the lead mandrel with inert shrink tube 14. Covering the shielded lead mandrel 12 with reinforcing materials or fibers 16. Impregnating the reinforcing materials 16 with a binder such as polyimide resin material. Laying up of the coated mandrels 10 with optimal interior 21 and exterior 18 facing materials to form a composite radome 22. Curing the resinous binder material. Cutting holes 24 in the interior surface layer 21, reinforcing sleeve 16, and heat shrinkable tubes 14 to expose or vent the lead mandrels 12. Heating the radome above 620° F. to melt out the lead 12 from the interior of composite structure. After the lead mandrels 12 have been removed, heating the Teflon shrink tubes 14 to reduce their cross-sectional area. Removing the heat shrinkable tubes 14 together with any remaining lead particles from the interior of the composite radomes 22.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A method for making a hollow composite structure comprising the steps of:
   forming a meltable mandrel with fixed rectangular cross section;
   enclosing the mandrel with an inert heat shrinkable material;
   heating the inert heat shrinkable material to shrink it tightly around the mandrel;
   covering the enclosed mandrel with fiber reinforcing material;
   impregnating the fiber reinforcement with curable binder;
   curing the binder in the fiber reinforcing material, thereby forming said hollow composite structure;
   venting the meltable mandrel;
   melting the mandrel with heat and removing the melted mandrel from the heat shrinkable material;
   then additionally heating the heat shrinkable material to reduce its cross-sectional area; and
   removing the heat shrinkable material from inside of the hollow composite structure.

2. Method of claim 1 wherein the meltable mandrel is lead.

3. Method of claim 2 wherein the heat shrinkable material is a Teflon shrink tube.

4. The method of claim 3 including applying facing sheets of binder impregnated fabric to opposite sides of the fiber covered mandrel.

5. Method of claim 4 wherein the binder is a polyimide resinous material.

6. Method of claim 5 wherein the fiber reinforcement is a glass or fused silica material.

* * * * *